July 7, 1964
G. H. KOH
3,140,156
CANISTER WITH OLFACTORY WARNER
Filed May 25, 1961
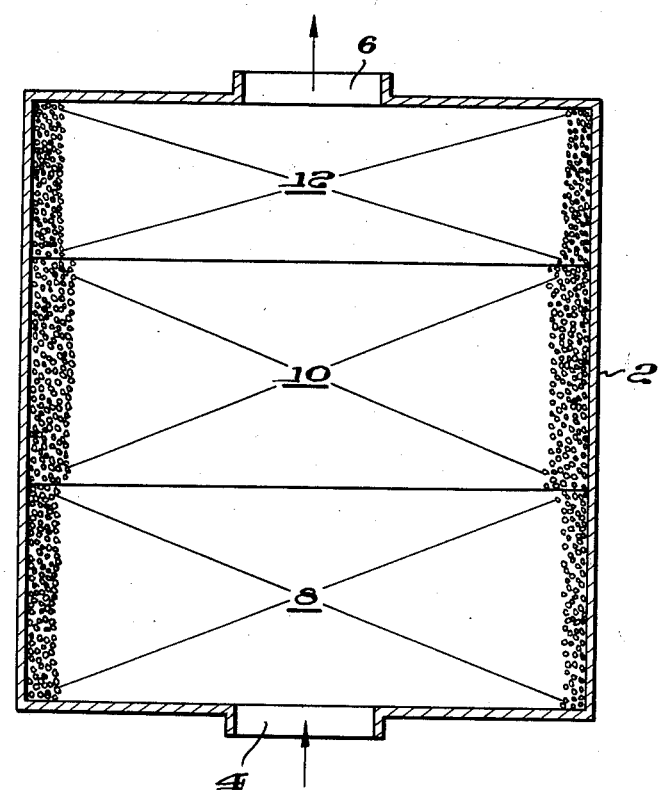
INVENTOR.
GUNTER H. KOH.
BY Ronald H Shakely
his ATTORNEY.

United States Patent Office 3,140,156
Patented July 7, 1964

3,140,156
CANISTER WITH OLFACTORY WARNER
Günter H. Koh, Berlin, Germany, assignor to Auergesellschaft G.m.b.H., Berlin, Germany, a corporation of Germany
Filed May 25, 1961, Ser. No. 112,500
Claims priority, application Germany June 9, 1960
3 Claims. (Cl. 23—288)

This invention relates to gas mask canisters giving protection against carbon monoxide, and more particularly to such canisters that indicate exhaustion of effective protection by an olfactory warning.

Olfactory warnings of canister exhaustion are especially effective since the warning will necessarily be communicated to the wearer of the breathing apparatus and it is a warning that cannot easily be ignored. When protecting against odorous gases or vapors, olfactory warnings are given to the wearer by the initial traces of gas or vapor penetrating the canister, but no such perception is possible in the case of completely odorless carbon monoxide.

Gas masks and related breathing apparatus for use in atmospheres containing carbon monoxide commonly contain oxidizing agents, such as the well-known Hopcalite, which are inactivated by moisture; water vapor is absorbed by the catalyst and its efficiency decreases to the point where the canister must be discarded. Usually an efficient drying substance is used in the canister in the path of the air ahead of the catalyst, i.e., upstream of the catalyst; this drying substance eventually becomes ineffective in use through absorption of moisture from the atmosphere and water vapor is then passed to the catalyst.

Heretofore olfactory warnings have been provided by a reagent disposed in the canister downstream of the catalyst which is reactive with water vapor to produce an odorous gas or vapor. Thus, if the effectiveness of the catalyst has been impaired to such an extent that initial traces of water penetrate the catalyst, an odor will be developed. It has been found, however, that the initial traces of warning odor are developed before the catalyst efficiency has been impaired to an extent that harmful amounts of carbon monoxide are passed, resulting in the incomplete utilization of the canister at the time of the warning signal.

It is therefore an object of this invention to provide a canister for protection against carbon monoxide having an olfactory warning of exhaustion that permits the full utilization of the canister without exposing the user to harmful amounts of carbon monoxide. Another object is to provide a moisture activated olfactory warning composition in which odor development is delayed. Still another object is to provide a method of making such delayed action olfactory warning compositions. Other objects will be apparent from the following description and claims.

The accompanying drawing shows in vertical section a canister in accordance with this invention. A canister 2 is provided with inlet opening 4 and outlet opening 6. Sequentially disposed in the canister from the inlet end to the outlet end are a layer 8 of drying material, a layer 10 of material that catalytically oxidizes carbon monoxide to carbon dioxide and is inactivated by water vapor, and a layer 12 of material which has a delayed reactivity with water vapor to produce an odorous gas. In operation, the air entering the canister is first dried by layer 8 and then passes through layer 10 where carbon monoxide is oxidized, and the purified air is discharged through layer 12 and outlet 6. When the drying agent becomes exhausted and passes water vapor to the catalyst layer 10, the catalyst begins to be inactivated and the air discharged through warning layer 12 contains water vapor. The warning layer 12 consists of a chemical reactive with water vapor to form an odorous gas that has a coating resistant to penetration by water vapor, so that the formation of odorous gas is delayed from the time of initial contact of layer 12 with water vapor. The type and thickness of the coating is predetermined to delay the effective contact of water vapor and the reactive chemical until the useful life of the canister is substantially complete.

According to this invention, the objects are achieved by providing a canister with an olfactory warning layer in which the odor-forming component producing odorous gases or vapors by reaction with water is contained in an envelope that delays for a controlled period of time the effective contact of water and the odor-forming component. The odor-forming material, suitably in the form of granules or pressed bodies, may be of any composition that produces odorous gases or vapors by reaction with water, e.g., calcium carbide or magnesium nitride. The envelope, or coating, may be made of a material permeable to water vapor, so that the water vapor can diffuse through it, or it may be made of a hydrateable inorganic substance which, in a certain phase of hydration, will release water to the enclosed odor-forming substance.

In the case of an envelope of water permeable material, any desired delay period is readily obtained by selection of the material and the thickness of the envelope, which determines the time required for water vapor to diffuse through the envelope according to principles well known to those skilled in the art. When the water vapor has penetrated the envelope it will then react with the odor-forming component to produce the olfactory warning gas, thereby building up pressure to rupture the envelope. When this occurs a sufficient amount of warning gas can spread rapidly into the respiratory channels of the user. Such envelopes may, for example, consist of cellulose derivatives or water-permeable plastics. The envelopes are formed by dipping granulated or pelletized odor-forming material into, or spraying it with, non-aqueous solutions of these organic materials or compounds.

In the case of an envelope of hydrateable inorganic substances, any desired delay is obtained by selection of the material and the mass of the envelope. When the coating is exposed to atmosphere containing water vapor, the water vapor will be absorbed by the coating until a certain proportion of water is held as a hydrate by the coating material; further exposure to atmosphere containing water vapor will result in a release of water from the coating to the odor-forming component, resulting in the generation and release of the warning gas. Any hydrateable inorganic compound which releases water during at least one phase of hydration may be used, and we have found anhydrous calcium halides, lithium halides, and mixtures thereof to be especially preferred.

The granulated or pelletized odor-forming component can be coated by a variety of methods, such as dipping them in the molten hydrateable substance. We have found that an exceptionally simple, fast, efficient, and practical method consists in mixing the odor-forming substance, e.g., calcium carbide 2–4 mm. grain size, with crystalline or powdered inorganic hydrateable material, e.g., calcium chloride, lithium chloride, or mixtures thereof, which is subsequently melted with constant stirring. A homogeneous melt results which, after cooling, contains a uniform distribution of odor-forming material within the solidified hydrateable material. The material is then crushed and reduced into the desired granule size to provide a warning layer in canisters in the same way as pure calcium carbide has heretofore been used for this purpose.

For example, a mixture of anhydrous calcium chloride and anhydrous lithium chloride containing 65% by volume calcium chloride is prepared. A 10% addition of calcium carbide is added to and thoroughly mixed with the chloride. This mixture is melted with stirring and then poured for cooling and solidification. The solidified material is crushed and reduced to the desired grain size.

This invention is further illustrated by the comparison of two canisters containing equal amounts of conventional carbon monoxide oxidation catalyst, one of which contained an olfactory warner of pure calcium carbide, the other containing the olfactory warner of calcium carbide coated with calcium chloride-lithium chloride, prepared according to the above mentioned example. The canister was tested using a lung machine at a flow rate of 30 liters per minute and a test stream of air at 20° C. having a relative humidity of 75% and a 0.1% by volume concentration of carbon monoxide. Odor perception occurred after only 120 minutes in the canister using pure calcium carbide, and at this time no carbon monoxide was passing the canister. Using the olfactory warner of this invention, there was no odor perception until 500 minutes, at which time the canister was passing air containing only 0.01% by volume concentration of carbon monoxide (0.01% being the maximum permissible concentration in working locations). Thus the practical useful life of the canister, that is, the elapsed time until the warning signal is perceived, was increased to more than four times by the use of the delayed action olfactory warner.

According to the provisions of the patent statutes, I have explained the principle of my invention and have illustrated and described what I now consider to represent its best embodiments. However, I desire to have it understood that, within the scope of the appended claims, the invention may be practiced otherwise than as specifically illustrated and described.

I claim:
1. A gas mask canister comprising a catalyst capable of oxidizing carbon monoxide and that is inactivated by water vapor, an olfactory warning material disposed downstream of said catalyst, said olfactory warning material consisting essentially of a material reactive with water vapor to form an odorous gas coated with a salt selected from the group consisting of anhydrous calcium halides, anhydrous lithium halides and mixtures thereof.
2. A canister according to claim 1 in which the coating is a homogeneous mixture of anhydrous calcium chloride and anhydrous lithium chloride.
3. A gas mask canister comprising a catalyst capable of oxidizing carbon monoxide and that is inactivated by water vapor, an olfactory warning material disposed downstream of said catalyst, said olfactory warning material consisting essentially of granules of calcium carbide coated with a mixture of anhydrous calcium chloride and anhydrous lithium chloride.

References Cited in the file of this patent

UNITED STATES PATENTS

| | | |
|---|---|---|
| 1,414,194 | Levy | Apr. 25, 1922 |
| 1,595,788 | Kerschbaum | Aug. 10, 1926 |
| 1,840,611 | Stampe | Jan. 12, 1932 |
| 1,867,965 | Davidson et al. | July 19, 1932 |
| 1,925,905 | Newmann | Sept. 5, 1933 |
| 1,966,553 | Kropp | July 17, 1934 |
| 2,143,008 | Heath et al. | Jan. 10, 1939 |
| 3,019,342 | Brooke | Jan. 30, 1962 |

FOREIGN PATENTS

| | | |
|---|---|---|
| 25,750 | Great Britain | of 1897 |
| 345,672 | Great Britain | Mar. 23, 1931 |
| 481,429 | Great Britain | Mar. 7, 1938 |